United States Patent [19]

Deficis

[11] 4,036,060

[45] July 19, 1977

[54] TEMPERATURE MEASURING PROCESS AND PROBE

[75] Inventor: Alain Deficis, Toulouse - Cedex, France

[73] Assignee: Agence Nationale de Valorisation de la Recherche (ANVAR), Neuilly-sur-Seine, France

[21] Appl. No.: 713,260

[22] Filed: Aug. 10, 1976

[30] Foreign Application Priority Data

Aug. 13, 1975 France .............................. 75.25462

[51] Int. Cl.$^2$ ............................................. G01K 5/02
[52] U.S. Cl. ................................... 73/368; 73/368.2; 240/1 LP; 250/231 R; 356/209
[58] Field of Search ...................... 73/344, 368, 368.2, 73/339 R; 250/231 R; 240/1 LP; 356/209

[56] References Cited

U.S. PATENT DOCUMENTS

| | | | |
|---|---|---|---|
| 3,107,529 | 10/1963 | Johnston, Jr. | 73/339 R |
| 3,445,677 | 5/1969 | Leffwich | 73/344 X |
| 3,513,704 | 5/1970 | Hatcher | 73/339 R |
| 3,886,544 | 5/1975 | Narodny | 240/1 LP X |
| 3,950,987 | 4/1976 | Slezinger et al. | 73/339 R X |
| 3,960,017 | 6/1976 | Romanowski | 250/231 R X |

Primary Examiner—Richard C. Queisser
Assistant Examiner—Charles Gorenstein
Attorney, Agent, or Firm—Keil, Thompson & Shurtleff

[57] ABSTRACT

A process and a probe for measurement of temperatures of a given medium and also for measurement of the density of electromagnetic power of a medium at a given temperature is provided wherein a beam of light is transmitted into a capillary enclosure containing a liquid having a reflecting meniscus so that light is reflected from said meniscus and the reflected light is transmitted out of said enclosure whereby the intensity of reflected light can be measured as compared to that of the incident light.

14 Claims, 4 Drawing Figures

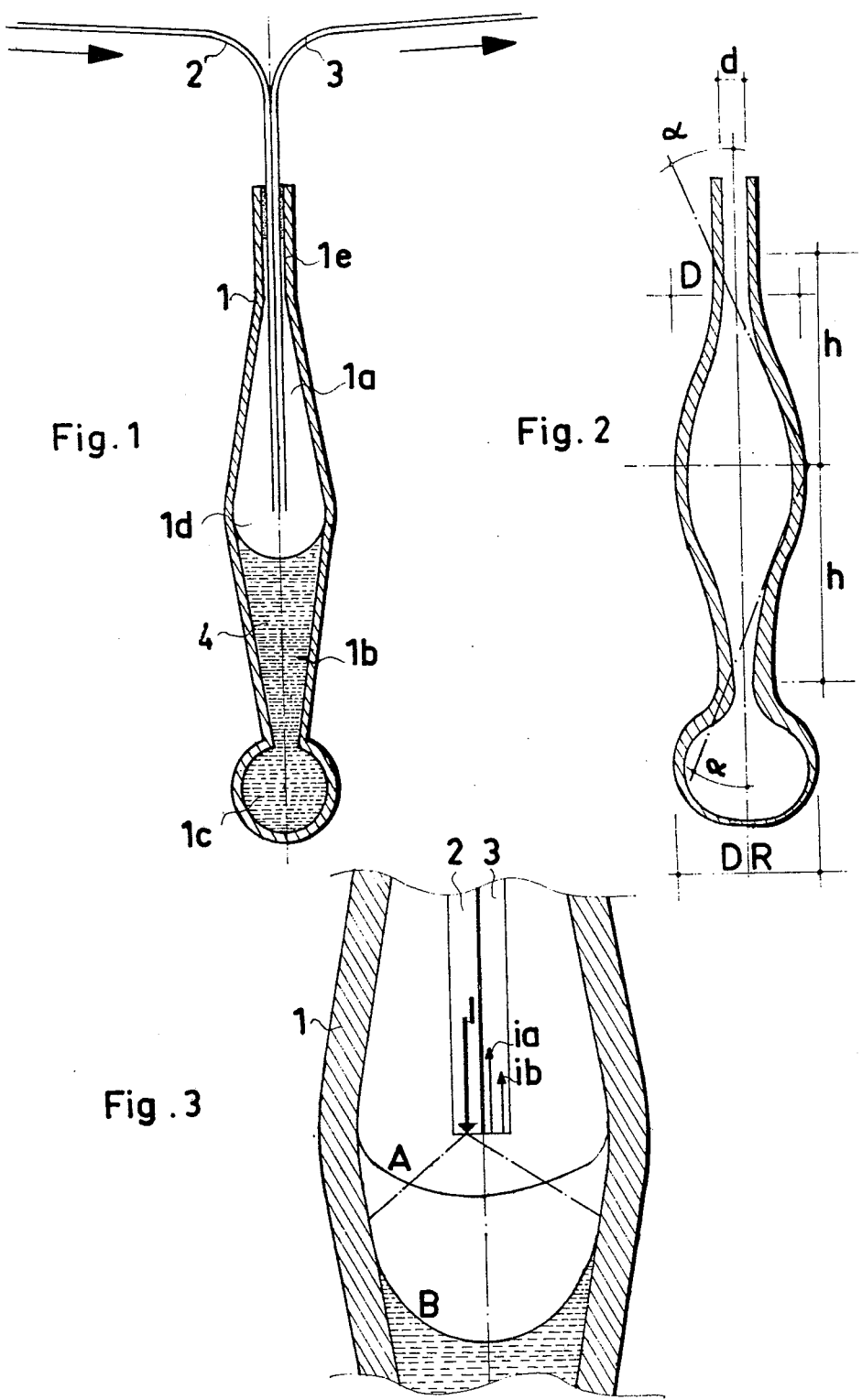

TEMPERATURE MEASURING PROCESS AND PROBE

The present invention relates to a process and to a probe for the measurement of temperatures or of temperature variations. It is more especially relates to a miniature-type probe, which can be fitted to measure both the temperature of the medium and its variations over a significant range, regardless of the electromagnetic radiation to which said medium is subjected. It can also be adapted to measure the density of the electromagnetic power of a medium at a given temperature.

French Pat. No. F 72.391.75 describes a device for the remote measurement of temperature, making use of the variations in the optical properties of liquid cholesterol crystals, as a function of temperature, to make possible the determination of the latter. The main drawback of such a device is that the temperature range within which said crystals can be used is limited between approximately 10° and 40° C.

The purpose of the present invention is to provide a process for remote measurement which can be used over a much wider temperature range, (especially between −50° C and +150° C.) so that it can be used in most of the applications in the various industrial sectors.

Another purpose of the invention is to provide a miniature probe having an excellent sensitivity and a high speed of response.

Another purpose is to supply, for each application, a preadjusted probe, so that its sensitivity is maximum within the range of the temperatures of use.

Another purpose is to provide an embodiment of a probe suitable to indicate temperature measurements under electromagnetic radiation, even an intense one, without said radiation being disturbed by the presence of said probe.

Another purpose is to supply another embodiment suitable to provide a measurement of the density of the electromagnetic power of a medium.

To that end, according to the present invention, a process of measurement of temperature consists in (1) bringing to the temperature to be measured a given mass of a thermoexpansible liquid contained inside a capillary enclosure, so as to form a reflecting meniscus of variable position, as a function of the temperature, (2) in directing a light beam toward said meniscus, (3) in collecting the reflected light in a reception zone the position of which is set, located across from said meniscus, and (4) in measuring the intensity of the reflected light as compared to that of the incident light.

The thermoexpansible liquid is, for example, a liquid with capillary excess pressure, forming a concave meniscus inside the capillary enclosure. The light intensity collected depends on the position of the meniscus with respect to the zone of reception and, therefore, on the expansion undergone by the liquid. The physical properties of the thermoexpansible liquid are chosen so that the latter remains in the liquid state within the range of the temperatures of use. By means of a suitable choice of said liquid, said range may be very wide and it can extend, for example, from −50° C. to +150° C.

Preferably, the enclosure used is a circular enclosure, the directrix of which has a predetermined shape which gives it a variable section along its longitudinal axis. It is thus possible to make use of the law of displacement of the meniscus as a function of the temperature variations, in order to obtain a maximum sensitivity at a given temperature.

A thermometric probe, according to the present invention, suitable for the practice of the above indicated process, includes a capillary enclosure which is internally limited by a surface of revolution the directrix of which has a predetermined shape, a thermoexpansible liquid contained in said enclosure, so as to form a meniscus inside same, a first optical conductor the purpose of which is to bring a beam of light from a source, and which penetrates into the enclosure so that its emitting end is located facing the meniscus, finally a second conductor of light, the purpose of which is to transmit the captured light back toward light analysis means, and which penetrates the enclosure in a manner such that its receiving end faces the meniscus.

The liquid containing enclosure is a capillary enclosure, the section of which is very small, of the order of one millimeter, and the quantity of light used is very small. The probe therefore has a negligible thermal inertia, which causes a very rapid attainment of the temperature, without any appreciable disturbance of the medium. Furthermore, its miniature dimensions make it possible to implant it into various media, the access to which is difficult. Its connection with the outside (especially with the light source and with the light analysis means) is achieved by means of optical conductors, which, for example, are composed of optical fibers of very small diameter, (a few tens to a few hundreds of microns) which can be deformed to follow a given trajectory (under the sole condition that the radii of the curve be large enough).

Other characteristics, purposes and advantages of the present invention will be seen from the following description, with reference to the attached drawing. In said drawing, which constitutes an integral part of the description:

FIG. 1 is a schematic view, in enlarged scale, of a thermometric probe according to the present invention;

FIG. 2 is a sectional view of a probe enclosure formed of glass, of the pyrex type;

FIG. 3 is a partial view, in enlarged scale, meant to clarify the principle of functioning of the probe according to the present invention.

Figure 4:
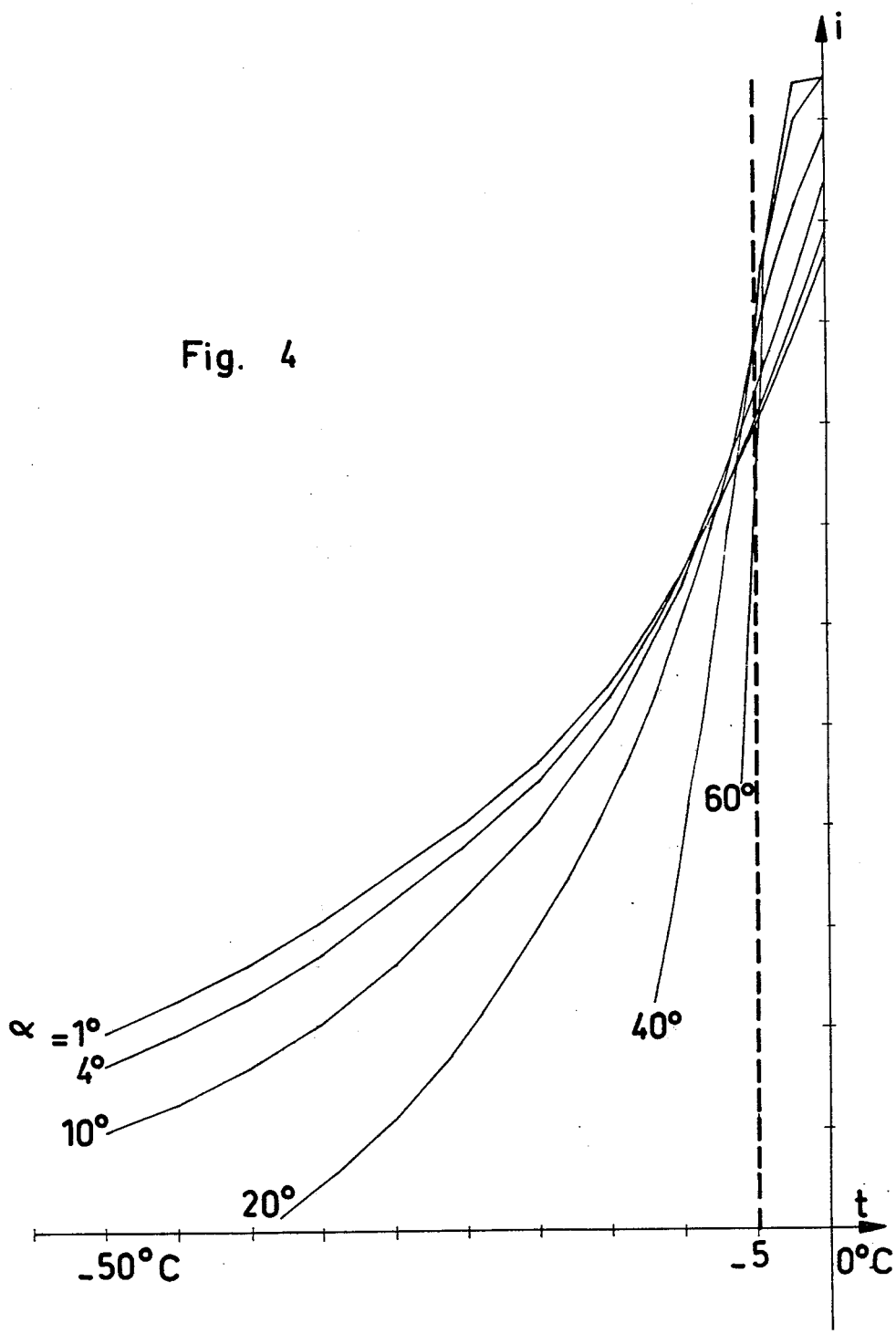
FIG. 4 illustrates several curves of light intensity variation, obtained as a function of the temperature of probes of different conicity.

The thermometric probe schematically illustrated as an example in FIG. 1 includes a capillary enclosure 1, forming two chambers 1a and 1b, and a bulb-shaped reservoir 1c, The enclosure 1 around its longitudinal axis has a divergent shape from the reservoir 1c toward the maximum diameter of central zone 1d, then a convergent shape from said central zone, up to end 1e. The two contiguous chambers 1a and 1b thus become narrower from the central zone 1d up to the ends of the enclosure.

In the example, chambers 1a and 1b approximately present the shapes of truncated cones which join at their large base at the level of zone 1d.

At the end 1e of the enclosure, there are sealed two optical fibers or bundles of optical fibers 2 and 3, which axially enter same, so that their ends are disposed side by side in chamber 1a. Fiber 2 is meant to carry a beam of light and is associated with a source (not shown). FIG. 3 is meant to return the reflected light, and is associated with analysis means which make it possible to measure the intensity of the reflected light, as compared to that of the incident light injected into fiber 2.

A thermoexpansible liquid 4 is put into chamber 1b and into reservoir 1c, so as to form a meniscus facing emitting and receiving ends of fibers 2 and 3, respectively. Said liquid is a liquid with capillary excess pressure, and forms a concave meniscus inside said capillary enclosure.

The quantity of liquid placed inside the enclosure, and the position of the ends of the fibers are adjusted so that, at the highest temperature of the range of use, the end of the fibers is located a small distance from the meniscus, and does not penetrate the liquid.

As an illustration of the dimensions of the probe according to the present invention in its central zone 1d, it may have a diameter approximately between 1 millimeter and 3 millimeters, and it may be approximately 2 millimeters to 10 millimeters in height.

FIG. 2 illustrates, as an example, an enclosure such as may be practically formed of pyrex. In this embodiment the halfheight h is of the order of 2.5 millimeters, diameter D in the central zone is of the order of 2 millimeters, the diameters d of the ends are of the order of 0.5 millimeter, and the diameter DR of the bulb-shaped reservoir is of the order of 3 millimeters.

FIG. 3 illustrates the functioning principle of the probe wherein a meniscus A corresponds to a temperature T. Fiber 2 emits a beam of light the intensity of which is I. Said light beam is reflected by meniscus A and by the walls of the enclosure, and a fraction ia is collected by the receiving fiber.

When temperature decreases to become stable at a value $t < T$, the liquid contracts, and the meniscus assumes a position B which is more remote from the fibers and the concave characteristic of which is more marked (since the section is narrower). The light intensity collected has decreased, and its value ib (as compared to value I, of course) gives a measurement of the temperature t.

The position of the ends of the fibers in chamber 1a, the quantity of liquid contained inside the enclosure and the angle of conicity of chambers 1a and 1b constitute parameters which are adjusted at the time of fabrication of the probe, in order to provide optimum sensitivity of said probe as well as the range of the temperatures of use, as a function of the application anticipated. Thus, it is possible to have a very high sensitivity in proximity to a given temperature, especially in order to carry out temperature measurements for given phenomena occurring near a relatively specific temperature.

FIG. 4 illustrates as an example, curves of variations of intensity collected as a function of temperature for probes of the type shown in FIG. 2, which have different summit half-angles $\alpha$, the quantity of liquid contained being of the order of 15 cubic millimeters.

It can be seen that, at $-5°$ C. for example, the sensitivity is higher as the angle $\alpha$ is larger.

An interesting application of the probe according to the present invention is the measurement of the temperatures or of the temperature variations of a medium subjected to an electromagnetic radiation. In this case, the thermoexpansible liquid used is a liquid the power of absorption of which is negligible, with respect to electromagnetic waves, at the radiation frequency. The materials which compose the enclosure and the optical conductors themselves have a negligible power of absorption with respect to such waves.

Thus, the temperature which is being measured is not falsified by a parasitic heating of the liquid, caused by the radiation. Moreover, said radiation is not distrubed by the presence of the probe.

In such a case, for example, the enclosure may be formed of pyrex of the SOVIREL S. 732.01 type, and the optical conductors may be composed of CROFON fibers manufactured by the firm DuPont De Nemours.

There is a wide choice of usable thermoexpansible liquids. The latter may, for example, consist of silicone oil of the RHODORSIL 47 V100 ST type, manufactured by Rhone Poulenc. This oil, which is perfectly satisfactory for this type of application, has the following characteristics:

very low absorption parameter: $tg\delta = 10^{-3}$ for a frequency of $10^5$ Hz.

positive surface tension = 20 to 21 dynes per millimeter viscosity at 25°C. = 100 centistokes liquid between $-50°$C. and 150°C.

Another application of the probe is in the measurement of the power density of a medium subjected to radiation. In such a case, on the contrary, a heating of the liquid by means of the radiation is sought, either by means of heating in the very midst of the liquid, through the use of an absorbing liquid, or by means of a heating of the enclosure, through the use of an absorbing enclosure which will heat the liquid by contact, or even by means of heating caused by the two processes combined.

The heating intensity of the liquid is a function of the power density of the radiation and the difference between the temperature of the probe, and that of the medium gives a measurement of said intensity, possibly through direct reading after the apparatus has been calibrated.

It is possible to use as the absorbing liquid a liquid which itself has a high power of absorption at the radiation frequency, for example:

dichlorpentane ($tg\delta = 13500.10^{-3}$ at $10^5$ Hz)

ethylene glycol ($tg\delta = 1000.10^{-3}$ at $3.10^9$ Hz)

It is evident that the nature of the liquid will depend on the wave length of the radiation.

It is also possible to choose a non-absorbing liquid, such as the above indicated silicone oil, and to transform it, by means of a colloidal graphite suspension or by means of a fine metallic powder or of any other substances capable of giving said liquid the desired properties of absorption.

It should be noted in this application that it may be desirable to cover the enclosure with a heat insulating envelope in order to reduce outside losses.

The process and the probe according to the present invention may be applied, generally speaking, for all temperature measurements over a wide range and, particularly, for measurements requiring a high sensitivity, for measurements to be made in zones difficult to reach, for measurements requiring high speeds of response, for measurements under electromagnetic radiations, etc.; insertion into a living organism for a measurement of local temperature; control of, and optimum distribution of energy in industrial radiation systems (thawing of meats, sterilization of foods by means of microwaves, and measurement of the temperature variations in transitory phenomena, etc.

The invention is hereby claimed as follows:

1. A process for the measurement of temperatures which comprises (1) bringing to the temperature to be measured a predetermined mass of a thermoexpansible liquid contained in a capillary enclosure so as to form a reflecting meniscus in said enclosure, the position of which varies as a function of the temperature, (2) directing a beam of light toward said meniscus, (3) collecting the reflected light in a reception zone the position of which is predetermined and which is located across from and facing said meniscus, and (4) measuring the intensity of the reflected light as compared to that of the incident light.

2. A process as claimed in claim 1 where the liquid which can be expanded by heat is contained inside a revolution enclosure the directrix of which has a given shape that confers upon it a variable section along its longitudinal axis for the purpose of making use of the law of displacement of the meniscus as a function of the temperature variations in order to obtain a maximum sensitivity at a given temperature.

3. A thermometric probe comprising a closed capillary enclosure internally limited by a revolution surface the directrix of which has a predetermined shape, a liquid which expands under the action of heat contained inside said enclosure so as to form a meniscus inside same, a first optical conductor to bring a beam of light from a source and which penetrates inside the enclosure so that its emitting end is disposed facing the meniscus, and a second optical conductor to return the reflected light to light analysis means and which penetrates into the enclosure so that its receiving end is disposed facing said meniscus.

4. A thermometric probe as claimed in claim 3 wherein the liquid which is expanded by heat is a liquid with capillary excess pressure forming a concave meniscus inside the capillary enclosure.

5. A thermometric probe as claimed in claim 3 wherein the directrix of the internal surface of the enclosure is such that the latter presents, around its longitudinal axis, a divergent shape up to a central zone of maximum diameter, then a convergent shape starting from said central zone, so as to define two contiguous chambers which become wider toward said central zone, the liquid which expands under heating being located in one of the chambers, and the ends, both emitting and receiving, of the optical conductors being in the other one.

6. A thermometric probe as claimed in claim 5 wherein the enclosure includes at the end of the one chamber containing the thermoexpansible liquid, a bulb-type reservoir which communicates with said one chamber and fills it with said liquid.

7. A thermometric probe as claimed in claim 5 wherein said chambers are approximately the shape of truncated cones which are joined by their wider bases.

8. A thermometric probe as claimed in claim 7 wherein the half-angle at the summit of each chamber in the shape of a truncated cone is adapted to the desired sensitivity over a given temperature range.

9. A thermometric probe as claimed in claim 3 wherein said optical conductors are each composed of at least one optical fiber and are disposed side by side along the longitudinal axis within said enclosure.

10. A thermometric probe as claimed in claim 5 wherein said enclosure has in said central zone, a diameter which ranges approximately between 1 millimeter and 3 millimeters, and an overall height in the longitudinal direction, which ranges approximately between 2 millimeters and 10 millimeters.

11. A thermometric probe as claimed in claim 3 wherein said liquid has absorption power which is negligible with respect to electromagnetic waves and the material which composes said enclosure and said conductors has a negligible power of absorption with respect to said waves, whereby said probe can be used to measure temperature under electromagnet radiation.

12. A thermometric probe as claimed in claim 11 wherein said liquid is silicone oil.

13. A thermometric probe as claimed in claim 3 wherein said liquid has a predetermined absorption power with respect to electromagnetic microwaves which makes it possible to measure density of electromagnetic power in a medium.

14. A thermometric probe as claimed in claim 3 wherein said enclosure is composed of a material which has a predetermined absorption power with respect to electromagnetic microwaves, whereby it is possible to use said probe to measure density of electromagnetic power in a medium.

* * * * *